(12) United States Patent
Richards et al.

(10) Patent No.: US 8,438,913 B2
(45) Date of Patent: May 14, 2013

(54) CLOG RESISTANT WING UNION PRESSURE SENSOR

(75) Inventors: Brian Richards, Upper Arlington, OH (US); Tom Yang, Mansfield, OH (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 13/098,909

(22) Filed: May 2, 2011

(65) Prior Publication Data

US 2012/0279309 A1    Nov. 8, 2012

(51) Int. Cl.
*G01L 7/00* (2006.01)
*G01L 9/04* (2006.01)

(52) U.S. Cl.
USPC .................................. 73/76; 73/716; 73/720

(58) Field of Classification Search .......... None
See application file for complete search history.

(56) References Cited

U.S. PATENT DOCUMENTS

| | | | | |
|---|---|---|---|---|
| 4,745,810 A | * | 5/1988 | Pierce et al. | 73/706 |
| 5,095,755 A | * | 3/1992 | Peterson | 73/706 |
| 6,041,659 A | * | 3/2000 | Wilda et al. | 73/720 |

* cited by examiner

*Primary Examiner* — Andre Allen
(74) *Attorney, Agent, or Firm* — Ingrassia Fisher & Lorenz, P.C.

(57) ABSTRACT

A clog resistant wing union pressure sensor is provided that includes a transmitter housing and a flange section. The flange section is coupled to the transmitter housing and has a pressure port formed therein that includes an open first end, a closed second end, and an inner surface that defines a bore between the open first end and the closed second end. The closed second end is defined by a pressure sensitive diaphragm and has a diameter. The pressure port has a depth defined between the open first end and the closed second end, the bore is tapered between the open first end and the closed second end, and is further defined by a rounded transition between the inner surface and the closed second end, and the diameter of the closed second end is greater than twice the depth of the pressure port.

20 Claims, 2 Drawing Sheets

US 8,438,913 B2

CLOG RESISTANT WING UNION PRESSURE SENSOR

TECHNICAL FIELD

The present invention generally relates to pressure sensors, and more particularly relates to wing union pressure sensors.

BACKGROUND

Pressure sensors are used in myriad systems and environments to sense the pressures of various types of fluids. One particular environment in which one or more pressure sensors may be used is a new or an existing oil well. In this particular environment, pressure sensors may be used to sense the pressure of various fluids that may be pumped down a well. These fluids may include, for example, water, various acids, carbon dioxide, drilling mud, and cement, just to name a few. The pressure sensors that are installed into the fluid systems that supply these fluids are sometimes referred to as wing union pressure sensors. This is because these pressure sensors typically include a flange that is fitted into the delivery system via a wing union. The flange includes a port that is exposed to the fluid and that leads to a recessed area, or cavity, where a pressure sensitive device, such as a diaphragm, is disposed so that it is not directly exposed to the flow path of the fluid.

The pressure sensors described above are generally safe, reliable, and robust, but can suffer certain drawbacks. For example, the configurations of the pressure ports and recessed cavities can be clogged or jammed with some of the fluids and/or materials within the fluids, which can reduce sensor accuracy and/or inhibit sensor operability altogether. Some pressure sensors also exhibit relatively high stress locations within the sensors, which can reduce sensor lifetime.

Hence, there is a need for a pressure sensor that may be installed into fluid delivery systems that deliver relatively harsh, corrosive, and abrasive materials that will not become clogged or jammed with the fluids and/or materials within the fluids, and/or does not exhibit relatively high stress locations within the sensor. The present invention addresses at least these needs.

BRIEF SUMMARY

In one embodiment, a clog resistant wing union pressure sensor includes a transmitter housing and a flange section. The flange section is coupled to the transmitter housing and has a pressure port formed therein. The pressure port includes an open first end and a closed second end. The closed second is end defined by a pressure sensitive diaphragm and has a diameter. The pressure port has a depth defined between the open first end and the closed second end. The diameter of the closed second end is greater than twice the depth of the pressure port.

In another embodiment, a clog resistant wing union pressure sensor includes a transmitter housing and a flange section. The flange section is coupled to the transmitter housing and has a pressure port formed therein. The pressure port includes an open first end, a closed second end, and an inner surface that defines a bore between the open first end and the closed second end. The closed second end is defined by a pressure sensitive diaphragm and has a diameter. The pressure port has a depth defined between the open first end and the closed second end, the bore is tapered between the open first end and the closed second end, and is further defined by a rounded transition between the inner surface and the closed second end, and the diameter of the closed second end is greater than twice the depth of the pressure port.

In still another embodiment, a flange section for a wing union pressure sensor includes a main body having a first side and a second side. A pressure port is formed in the second side. The pressure port includes an open first end and a closed second end. The closed second end is defined by a pressure sensitive diaphragm and has a diameter. The pressure port has a depth defined between the open first end and the closed second end. The diameter of the closed second end is greater than twice the depth of the pressure port.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
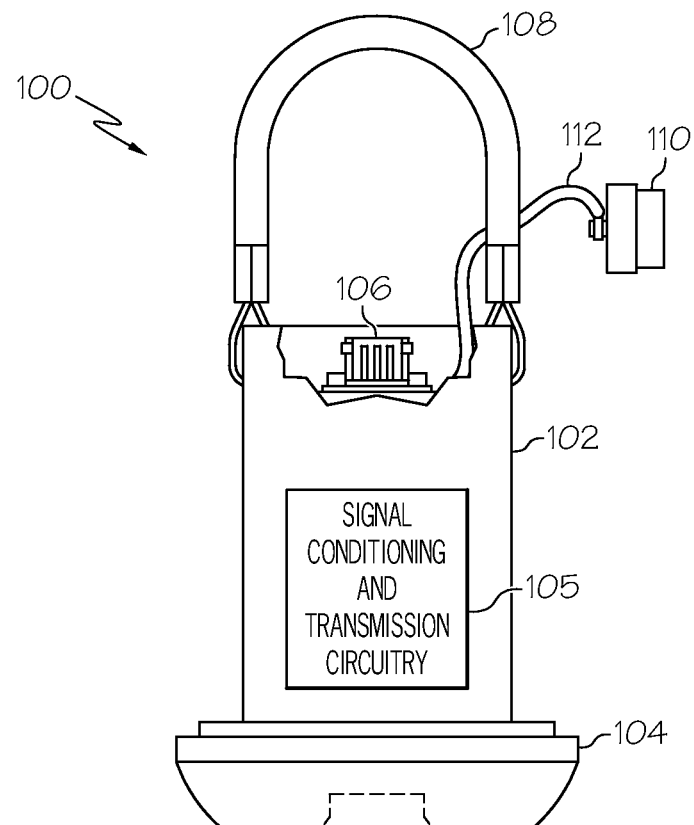
FIG. 1 depicts a front view of one example of an embodiment of a wing union pressure sensor.
Figure 2:
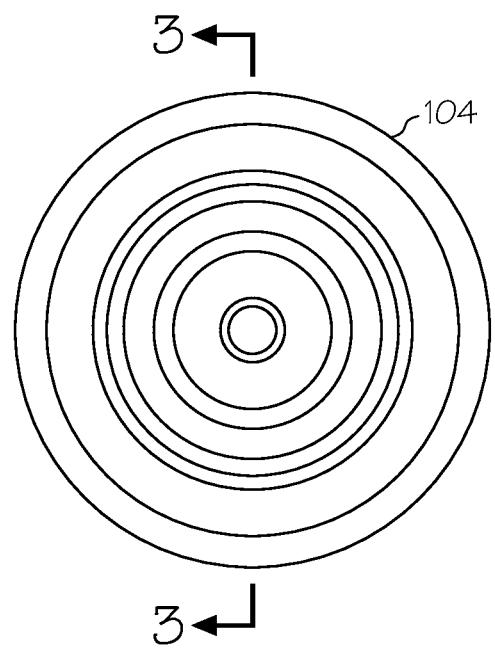
FIG. 2 depicts a top view of a flange section that may be used to implement the wing union pressure sensor depicted in FIG. 1.

Referring to FIG. 1, a front view of an exemplary embodiment of a wing union pressure sensor 100 is depicted and includes a transmitter housing 102 and a flange section 104. The transmitter housing 102 is coupled to the flange section 104 and, as shown in block diagram form, has various signal conditioning and transmission circuitry 105 disposed therein. The circuitry 105 may include, for example, an amplifier to boost the signal to 4-20 mA, 0-5 volts, or 0-10 volts, and/or may include a commercial communications bus (e.g., CAN bus). The circuitry 105 may also be configured to provide temperature compensation to reduce thermal effects on the output. The transmitter housing 102 also preferably includes a connector 106, which may be used to interconnect the pressure sensor 100 to one or more non-illustrated external systems. It will be appreciated that the transmitter housing 102 may be coupled to the flange section 104 using any one of numerous techniques. In the depicted embodiment, however, it is welded to the flange section 104.

As FIG. 1 further depicts, in some embodiments the pressure sensor 100 may additionally include a flexible carrying handle 108 and a connector protection cap 110. The handle 108, if included, may be coupled to the transmitter housing 102 using any one of numerous suitable techniques, and facilitates hand-carrying of the pressure sensor 100 by a person. The protection cap 110, if included, is configured to be selectively disposed over and removed from the connector 106, to thereby provide protection for and allow electrical connection to the connector 106, respectively. The protection cap 110 may also be coupled to the transmitter housing 102 using any one of numerous techniques. In the depicted embodiment, a lanyard chain 112 is used.

Figure 3:
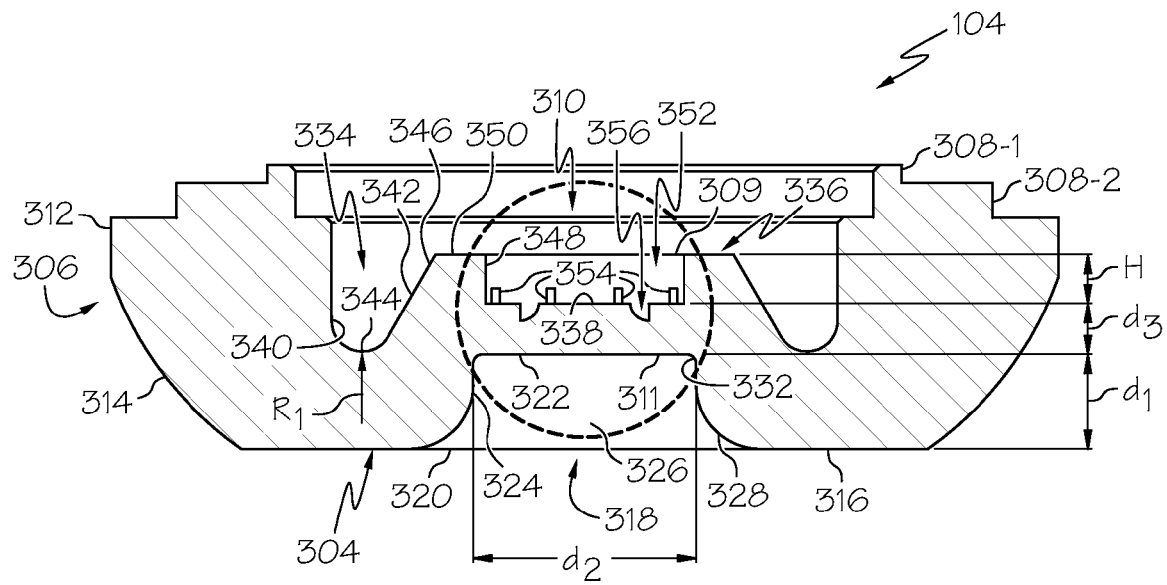
FIG. 3 depicts a cross section view of the flange section depicted in FIG. 2, and taken along line 3-3 in FIG. 2.

The flange section 104, as noted above, is coupled to the transmitter housing 102. As FIG. 3 depicts more clearly, the flange section 104 includes a first side 302, a second side 304, and an outer peripheral surface 306 between the first and second sides 302, 304. The first side 302 has a plurality of annuli 308-1, 308-2 formed therein. The transmitter housing 102 is configured to fit over the inner most annulus 308-1. The first side 302 also has the back (or second) side 309 of a pressure sensitive diaphragm 310 formed therein. The outer peripheral surface 306 includes cylindrical section 312 and a rounded section 314. The rounded section 314 transitions down to the second side 304 of the flange section 104, which has a lower diameter than that of the first side 302.

The second side 304 of the flange section 104 includes a substantially flat face section 316, and has a pressure port 318 formed therein that the substantially flat face section 316 surrounds. The pressure port 318 includes an open first end 320, a closed second end 322, and an inner surface 324 that defines a bore 326 between the open first end 320 and the closed second end 322. The open first end 320 of the pressure port 318 is defined by a rounded transition 328 from the flat face section 316 into the bore 326, and the closed second end 322 is defined by the front (or first) side 311 of the pressure sensitive diaphragm 310. The bore 326 is preferably tapered between the open first end 320 and the closed second end 322, and is further defined by a rounded transition 332 between the inner surface 324 and the closed second end 322.

As FIG. 3 also depicts, the pressure port 318 has a depth ($d_1$) defined between the open first end 320 and the closed second end 322, and the closed second end 322 has a diameter ($d_2$). The diameter-to-depth ratio ($d_2/d_1$) is selected such that the likelihood of the bore 326 being clogged is significantly reduced. The value of this ratio may vary, but is preferably greater than 2. In one particular embodiment, the diameter of the closed second end 322 is about 0.88 inches and the depth of the bore 326 is about 0.38 inches, resulting in a diameter-to-depth ratio ($d_2/d_1$) of about 2.31.

The first side 311 of the diaphragm 310, as noted above, defines the closed second end 322 of the pressure port 318. The second side 309 of the diaphragm 310 is defined by a first circumferential groove 334, a stiffener 336, and a sensor surface 338. The first circumferential groove 334 is disposed circumferentially outward from the stiffener 336 and the sensor surface 338, and extends to a depth ($d_3$) below the sensor surface 338. Although the depth ($d_3$) may vary, in the depicted embodiment the depth is such that the bottom of the first circumferential groove 334 is coextensive with the first side 311 of the diaphragm 310. The first circumferential groove 334 is defined by an outer wall 340, an inner wall 342, and a curved bottom 344 that interconnects the outer 340 and inner 342 walls. The outer wall 340 is disposed perpendicular to the flat face section 316, the inner wall 342 is angled inwardly toward the center of the diaphragm 310 at a predetermined angle, and the curved bottom 344 is formed with a predetermined radius ($R_1$). The first circumferential groove 334 provides isolation for strain gages 354 (described further below) from a clamping force that exists when the pressure sensor 100 is installed in a system.

The stiffener 336 extends a predetermined height (H) above the sensor surface 338, and includes stiffener outer wall 346, a stiffener inner wall 348, and a top surface 350. The stiffener outer wall 346 is coterminous with the inner wall 342 of the first circumferential groove 334, and is thus angled inwardly at the same predetermined angle. The stiffener inner wall 348 is disposed perpendicular to the sensor surface 338 and defines a central cavity 352. The stiffener 336, as this moniker implies, helps to stiffen the diaphragm 310. It will be appreciated that in some embodiments, the diaphragm 310 could be implemented without the stiffener 336, if needed or desired.

The sensor surface 338 has a plurality of strain gages 354 coupled thereto, and has a second circumferential groove 356 formed therein. The strain gages 354, which may be any one of numerous suitable strain gages, such as, for example, foil strain gages, may be adhered to the sensor surface 338, and then electrically coupled, via suitable conductors, to the signal conditioning and transmission circuitry 105 in the transmitter housing 102. Although four strain gages 354 are shown in the depicted embodiment, it will be appreciated that the pressure sensor 100 could include more or less than this number.

Figure 4:
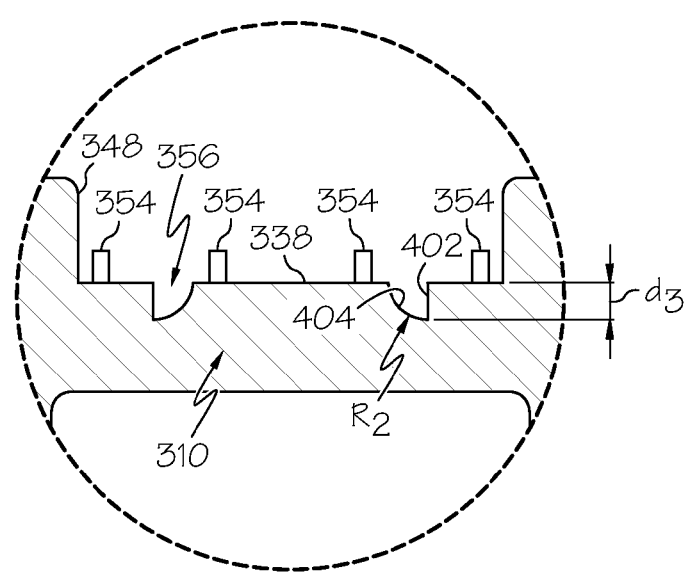
FIG. 4 depicts a close-up view of the portion of the flange section encircled by the dotted line in FIG. 3.

The second circumferential groove 356 extends into the sensor surface 338, which is depicted more clearly in FIG. 4, is defined by an outer wall 402 and an inner wall 404. The outer wall 402 extends to a predetermined depth (d3) into the diaphragm 310, and is disposed perpendicular to the sensor surface 338. The inner wall 404 also extends to the predetermined depth into the diaphragm 310, but is rounded toward the outer wall 402 at a predetermined radius ($R_2$). The second circumferential groove 356 provides relatively optimal stress on the strain gages 354.

The flange section 104 may be formed from bar stock by conventional machine shop lathe turning. The bar stock material may be, but is not limited to, Inconel, nickel alloys, or stainless steel. After being formed, the flange section 104 is preferably heat treated to raise the tensile strength, and then cleaned to promote corrosion resistance and adhesion of the strain gages 354. The flange section 104 may then be welded to the transmitter housing 102.

The configuration of the pressure sensor 100, and more particularly the flange section 104 of the pressure sensor 100, is configured to provide an enlarged diaphragm as compared to those currently used as wing union pressure sensors. This will ensure the diaphragm 310 will flex even if it becomes coated with solids. The increased diameter-to-depth ratio ($d_2/d_1$) reduces the likelihood of bore 326 being clogged. Because the bore 326 is tapered, instead of straight, between the open first end 320 and the closed second end 322, solid removal from the bore 326 is enhanced. Moreover, the rounded transition 328 from the flat face section 316 into the bore 326 reduces the available area that may get jammed with solids.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A clog resistant wing union pressure sensor, comprising:
a transmitter housing;
a flange section coupled to the transmitter housing, the flange having a pressure port formed therein, the pressure port including an open first end and a closed second end, the closed second end defining a pressure sensitive diaphragm and having a diameter, the pressure port having a depth defined between the open first end and the closed second end,
wherein the diameter of the closed second end is greater than twice the depth of the pressure port.

2. The sensor of claim 1, wherein:
the pressure port has an inner surface that defines a bore between the open first end and the closed second end; and
the bore is tapered between the open first end and the closed second end.

3. The sensor of claim 2, wherein:
the flange section includes a first side and a second side;
the first side is coupled to the transmitter housing;
the second side has the pressure port formed therein, and includes a substantially flat face section that surrounds the open first end of the pressure port;
the open first end of the pressure port is defined by a rounded transition from the flat face section into the tapered bore.

4. The sensor of claim 2, wherein the bore is further defined by a rounded transition between the inner surface and the closed second end.

5. The sensor of claim 1, wherein:
the pressure sensitive diaphragm includes a first side and an opposing second side;
the first side defines the closed second end of the pressure port;
the second side is defined by a circumferential groove formed in the flange section.

6. The sensor of claim 5, wherein:
the circumferential groove is defined by an outer wall, an inner wall, and a curved bottom that interconnects the outer wall and inner wall;
the outer wall is disposed perpendicular to the first side;
the inner wall is angled inwardly toward a center of the diaphragm at a predetermined angle.

7. The sensor of claim 6, wherein:
the second side is further defined by a stiffener and a sensor surface;
the stiffener surrounds, and extends to a predetermined height above, the sensor surface;
the stiffener includes a stiffener outer wall, a stiffener inner wall, and a top surface;
the stiffener outer wall is angled inwardly at the predetermined angle; and
the stiffener inner wall is disposed perpendicular to the sensor surface and defines a central cavity.

8. The sensor of claim 7, further comprising:
a plurality of strain gages coupled to the sensor surface.

9. The sensor of claim 8, wherein:
the sensor surface has a second circumferential groove formed therein;
the second circumferential groove is defined by an outer wall and an inner wall;
the outer wall extends to a predetermined depth into the diaphragm and is perpendicular to the second side; and
the inner wall extends to the predetermined depth into the diaphragm and is rounded toward the outer wall at a predetermined radius.

10. A clog resistant wing union pressure sensor, comprising:
a transmitter housing; and
a flange section coupled to the transmitter housing, the flange having a pressure port formed therein, the pressure port including an open first end, a closed second end, and an inner surface that defines a bore between the open first end and the closed second end, the closed second end defining a pressure sensitive diaphragm and having a diameter,
wherein:
the pressure port has a depth defined between the open first end and the closed second end,
the bore is tapered between the open first end and the closed second end, and is further defined by a rounded transition between the inner surface and the closed second end, and
the diameter of the closed second end is greater than twice the depth of the pressure port.

11. The sensor of claim 10, wherein:
the flange section includes a first side and a second side;
the first side is coupled to the transmitter housing;
the second side has the pressure port formed therein, and includes a substantially flat face section that surrounds the open first end of the pressure port;
the open first end of the pressure port is defined by a rounded transition from the flat face section into the tapered bore.

12. The sensor of claim 10, wherein:
the pressure sensitive diaphragm includes a first side and an opposing second side;
the first side defines the closed second end of the pressure port;
the second side is defined by a circumferential groove formed in the flange section.

13. The sensor of claim 12, wherein:
the circumferential groove is defined by an outer wall, an inner wall, and a curved bottom that interconnects the outer wall and inner wall;
the outer wall is disposed perpendicular to the first side;
the inner wall is angled inwardly toward a center of the diaphragm at a predetermined angle.

14. The sensor of claim 13, wherein:
the second side is further defined by a stiffener and a sensor surface;
the stiffener surrounds, and extends to a predetermined height above, the sensor surface;
the stiffener includes a stiffener outer wall, a stiffener inner wall, and a top surface;
the stiffener outer wall is angled inwardly at the predetermined angle; and
the stiffener inner wall is disposed perpendicular to the sensor surface and defines a central cavity.

15. The sensor of claim 14, wherein:
the sensor surface has a second circumferential groove formed therein;
the second circumferential groove is defined by an outer wall and an inner wall;
the outer wall extends to a predetermined depth into the diaphragm and is perpendicular to the second side; and the inner wall extends to the predetermined depth into the diaphragm and is rounded toward the outer wall at a predetermined radius.

16. The sensor of claim 15, further comprising:
a plurality of strain gages coupled to the sensor surface.

17. A flange section for a wing union pressure sensor, the flange section comprising:
a main body having a first side and a second side;
a pressure port formed in the second side, the pressure port including an open first end and a closed second end, the closed second end defining a pressure sensitive diaphragm and having a diameter, the pressure port having a depth defined between the open first end and the closed second end,
wherein the diameter of the closed second end is greater than twice the depth of the pressure port.

18. The flange section of claim 13, wherein:
the pressure port has an inner surface that defines a bore between the open first end and the closed second end; and
the bore is tapered between the open first end and the closed second end.

19. The flange section of claim 13, wherein:
the second side includes a substantially flat face section that surrounds the open first end of the pressure port;
the open first end of the pressure port is defined by a rounded transition from the flat face section into the tapered bore; and
the tapered bore is further defined by a rounded transition between the inner surface and the closed second end.

20. The flange section of claim 13, wherein:
the pressure sensitive diaphragm includes a first side and an opposing second side;
the first side defines the closed second end of the pressure port;
the second side is defined by a first circumferential groove, a stiffener, and a sensor surface;
the first circumferential groove is defined by an outer wall, an inner wall, and a curved bottom that interconnects the outer wall and inner wall, the outer wall disposed perpendicular to the first side, the inner wall angled inwardly toward a center of the diaphragm at a predetermined angle;
the stiffener surrounds, and extends to a predetermined height above, the sensor surface, and includes a stiffener outer wall, a stiffener inner wall, and a top surface, the stiffener outer wall angled inwardly at the predetermined angle, the stiffener inner wall disposed perpendicular to the sensor surface and defining a central cavity.

* * * * *

UNITED STATES PATENT AND TRADEMARK OFFICE
CERTIFICATE OF CORRECTION

Page 1 of 1

PATENT NO. : 8,438,913 B2
APPLICATION NO. : 13/098909
DATED : May 14, 2013
INVENTOR(S) : Richards et al.

It is certified that error appears in the above-identified patent and that said Letters Patent is hereby corrected as shown below:

On the Title Page, under Item (75) Inventors:

(US); "Tom" Yang, Mansfield, OH (US)

should be changed to (US); --Tungsheng-- Yang, Mansfield, OH (US)

Signed and Sealed this
Eighteenth Day of June, 2013

Teresa Stanek Rea
*Acting Director of the United States Patent and Trademark Office*